(12) United States Patent
Hoshino et al.

(10) Patent No.: US 9,242,297 B2
(45) Date of Patent: Jan. 26, 2016

(54) PROCESS FOR PRODUCING POROUS SINTERED ALUMINUM, AND POROUS SINTERED ALUMINUM

(75) Inventors: Koji Hoshino, Kounosu (JP); Ji-bin Yang, Okegawa (JP); Kenji Orito, Niigata (JP); Shinichi Ohmori, Okegawa (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 1017 days.

(21) Appl. No.: 13/260,962

(22) PCT Filed: Mar. 30, 2010

(86) PCT No.: PCT/JP2010/002308
§ 371 (c)(1),
(2), (4) Date: Dec. 20, 2011

(87) PCT Pub. No.: WO2010/116682
PCT Pub. Date: Oct. 14, 2010

(65) Prior Publication Data
US 2012/0107166 A1    May 3, 2012

(30) Foreign Application Priority Data

Mar. 30, 2009  (JP) ................. P2009-082498

(51) Int. Cl.
*B22F 3/11* (2006.01)
*B22F 7/00* (2006.01)
(Continued)

(52) U.S. Cl.
CPC ............. *B22F 3/1125* (2013.01); *B22F 1/0059* (2013.01); *B22F 1/0085* (2013.01);
(Continued)

(58) Field of Classification Search
USPC .................................. 419/2; 75/249
See application file for complete search history.

(56) References Cited

U.S. PATENT DOCUMENTS 3,679,552 A * 7/1972 Jervis ............................ 205/161
4,331,477 A   5/1982 Kubo et al.
(Continued)

FOREIGN PATENT DOCUMENTS

CN   88103047 A   12/1988
CN    1133894 A   10/1996
(Continued)

OTHER PUBLICATIONS

International Search Report dated May 25, 2010, issued for PCT/JP2010/002308.
(Continued)

*Primary Examiner* — George Wyszomierski
*Assistant Examiner* — Ngoclan T Mai
(74) *Attorney, Agent, or Firm* — Locke Lord LLP; James E. Armstrong, IV; Nicholas J. DiCeglie, Jr.

(57) ABSTRACT

This method for producing porous sintered aluminum includes: mixing aluminum powder with a sintering aid powder containing titanium to obtain a raw aluminum mixed powder; mixing the raw aluminum mixed powder with a water-soluble resin binder, water, and a plasticizer containing at least one selected from polyhydric alcohols, ethers, and esters to obtain a viscous composition; drying the viscous composition in a state where air bubbles are mixed therein to obtain a formed object prior to sintering; and heating the formed object prior to sintering in a non-oxidizing atmosphere, wherein when a temperature at which the raw aluminum mixed powder starts to melt is expressed as Tm (° C.), a temperature T (° C.) of the heating fulfills Tm−10 (° C.)≤T≤685 (° C.).

1 Claim, 4 Drawing Sheets

(51) Int. Cl.

| | |
|---|---|
| *C22C 1/04* | (2006.01) |
| *C22C 1/08* | (2006.01) |
| *C22C 21/02* | (2006.01) |
| *C22C 21/12* | (2006.01) |
| *C22C 21/14* | (2006.01) |
| *C22C 21/16* | (2006.01) |
| *H01G 9/008* | (2006.01) |
| *H01G 11/68* | (2013.01) |
| *H01G 11/70* | (2013.01) |
| *H01M 4/66* | (2006.01) |
| *H01M 4/80* | (2006.01) |
| *B22F 1/00* | (2006.01) |
| *B22F 3/10* | (2006.01) |

(52) U.S. Cl.
CPC ............ *B22F3/1003* (2013.01); *B22F 3/1121* (2013.01); *B22F 7/006* (2013.01); *C22C 1/0416* (2013.01); *C22C 1/08* (2013.01); *C22C 21/02* (2013.01); *C22C 21/12* (2013.01); *C22C 21/14* (2013.01); *C22C 21/16* (2013.01); *H01G 9/016* (2013.01); *H01G 11/68* (2013.01); *H01G 11/70* (2013.01); *H01M 4/661* (2013.01); *H01M 4/666* (2013.01); *H01M 4/80* (2013.01); *B22F 2998/00* (2013.01); *Y02E 60/13* (2013.01)

(56) References Cited

U.S. PATENT DOCUMENTS

| | | | |
|---|---|---|---|
| 4,517,727 A * | 5/1985 | Shimizu et al. ............... 29/25.03 |
| 4,604,260 A * | 8/1986 | Shimizu et al. .................... 419/2 |
| 5,151,246 A | 9/1992 | Baumeister et al. |
| 5,597,665 A * | 1/1997 | Harada et al. .................. 429/235 |
| 5,951,791 A * | 9/1999 | Bell et al. ...................... 148/518 |
| 6,852,273 B2 | 2/2005 | Ivanov et al. |
| 6,926,969 B2 | 8/2005 | Bohm et al. |
| 2002/0170391 A1 | 11/2002 | Knott et al. |
| 2003/0115730 A1 | 6/2003 | Ament et al. |
| 2004/0146736 A1 | 7/2004 | Ivanov et al. |
| 2004/0191107 A1 | 9/2004 | Ishikawa et al. |
| 2009/0081444 A1 * | 3/2009 | Kattannek et al. ......... 428/306.6 |
| 2010/0032616 A1 | 2/2010 | Wada et al. |

FOREIGN PATENT DOCUMENTS

| | | |
|---|---|---|
| CN | 1144728 A | 3/1997 |
| CN | 1162499 A | 10/1997 |
| CN | 1464804 A | 12/2003 |
| JP | 56-077301 A | 6/1981 |
| JP | 61-48566 B2 | 10/1986 |
| JP | 04-231403 A | 8/1992 |
| JP | 08-209265 A | 8/1996 |
| JP | 08-325661 A | 12/1996 |
| JP | 08-339941 A | 12/1996 |
| JP | 09-072015 A | 3/1997 |
| JP | 09-143511 A | 6/1997 |
| JP | 2000-297334 A | 10/2000 |
| JP | 2002-266003 A | 9/2002 |
| JP | 2003-520292 A | 7/2003 |
| JP | 2004-035961 A | 2/2004 |
| JP | 3535282 B2 | 6/2004 |
| JP | 2004-218035 A | 8/2004 |
| JP | 3591055 B2 | 11/2004 |
| JP | 2005-290493 A | 10/2005 |
| JP | 2005-294013 A | 10/2005 |
| JP | 2007-046089 A | 2/2007 |
| JP | 2007-100176 A | 4/2007 |
| JP | 2007-238971 A | 9/2007 |
| JP | 2008-106294 A | 5/2008 |
| JP | 2009-043536 A | 2/2009 |
| JP | 2009174016 A | 8/2009 |
| JP | 2010-255089 A | 11/2010 |
| TW | 428049 B | 4/2001 |
| TW | 550613 B | 9/2003 |
| TW | 200825368 A | 6/2008 |

OTHER PUBLICATIONS

International Search Report dated May 25, 2010, issued for PCT/JP2010/002298.
International Search Report dated May 25, 2010, issued for PCT/JP2010/002311.
Notice of Allowance dated Nov. 20, 2013, issued for U.S. Appl. No. 13/375,589.
Office Action dated Dec. 5, 2012, issued for the Chinese patent application No. 201080014886.5 and English translation thereof.
Office Action mailed Jul. 9, 2013, issued for the Japanese patent application No. 2009-186616 and English translation thereof.
Office Action mailed Jul. 9, 2013, issued for the Japanese patent application No. 2009-186621 and English translation thereof.
Office Action mailed Jul. 30, 2013, issued for the Japanese patent application No. 2009-135021 and English translation thereof.
Office Action mailed Jun. 7, 2013, issued for the Chinese patent application No. 201080014014.9 and English partial translation of the Search Report.
N.D. Karsu et al. "Foaming behavior of Ti6Al4V particle-added aluminum powder compacts," J Mater Sci vol. 44, Nov. 6, 2008, pp. 1494-1505.
Office Action dated Apr. 5, 2013, issued for the Korean patent application No. 10-2011-7022557 and English translation thereof.
Office Action dated Apr. 5, 2013, issued for the Korean patent application No. 10-2011-7022553 and English translation thereof.
Search Report dated Feb. 22, 2013, included in the Office Action dated Mar. 4, 2013, issued for the Chinese patent application No. 201080034965.2 and English translation of the Search Report.
Notice of Allowance dated Jun. 9, 2014, issued for the Taiwanese patent application No. 099109627 and English translation thereof.
Office Action, dated Apr. 3, 2015, issued in U.S. Appl. No. 13/260,843.
Notice of Reasons for Rejection, issued in corresponding Japanese Patent Application No. JP 2013-185027, dated Dec. 15, 2014.

\* cited by examiner

PROCESS FOR PRODUCING POROUS SINTERED ALUMINUM, AND POROUS SINTERED ALUMINUM

CROSS REFERENCE TO RELATED APPLICATIONS

This application is related to co-pending application, U.S. Ser. No. 13/260,843, entitled, "PROCESS FOR PRODUCING POROUS SINTERED ALUMINUM, AND POROUS SINTERED ALUMINUM" filed on Sep. 28, 2011 in the names of Koji HOSHINO, Ji-bin YANG, Kenji ORITO and Shinichi OHMORI as a national stage application of International Application No. PCT/JP2010/002298, filed Mar. 30, 2010, which application is assigned to the assignee of the instant application and which co-pending application is also incorporated by reference herein.

TECHNICAL FIELD

The present invention relates to porous sintered aluminum (porous aluminum sintered body) and the production method thereof, and the porous sintered aluminum is particularly suitable as a current collector for a lithium-ion secondary battery and an electrical double layer capacitor.

The present application claims priority on Japanese Patent Application No. 2009-082498 filed on Mar. 30, 2009, the content of which is incorporated herein by reference.

BACKGROUND ART

Recently, aluminum foil has generally been used as a current collector for positive electrodes of a lithium-ion battery and an electrical double layer capacitor. In addition, such a battery and a capacitor have been used in electrical vehicles and the like in recent years, and the electrode with the current collector in the battery and the capacitor has been required to have a higher output and a higher energy density with the broadening of the usage purposes. As described in Patent Documents 1 and 2, porous aluminum body which includes open pores having a three-dimensional network structure has been known as a current collector for an electrode.

As a method for producing this porous aluminum body, a foam-melting method has been known as disclosed in Patent Document 3. In this foam-melting method, a thickener is added to a melted aluminum so as to increase the viscosity, and then titanium hydride as a foaming agent is added thereto. While foaming the melted aluminum by utilizing hydrogen gas generated in a thermal decomposition reaction of the titanium hydride, the melted aluminum is solidified. However, foamed aluminum obtained by this method includes large closed pores having sizes of several millimeters.

There are other methods, and the following method is exemplified as a second method. Aluminum is pressed into a casting mold having a core of sponge urethane, and a hollow cavity formed after burning off the urethane is filled with the aluminum. Thereby, foamed aluminum having a sponge skeleton is obtained. According to this method, foamed aluminum is obtained which includes open pores having pore diameters that fulfill 40 PPI or smaller, that is, 40 cells or less per inch (pore diameters of about 600 μm or larger).

The following method is exemplified as a third method. As disclosed in Patent Document 4, aluminum alloy is infiltrated into a reinforcing material made of hollow ceramics by the pressure infiltration method; and thereby, foamed aluminum is obtained which includes closed pores having pore diameters of 500 μm or smaller in accordance with the dimension of the reinforcing material.

The following method is exemplified as a fourth method. As disclosed in Patent Document 5, a mixed powder of AlSi alloy powder and $TiH_2$ powder is sandwiched between aluminum plate materials, and the mixed powder is heated and rolled in such a state. Thereby, aluminum is foamed due to the decomposition of the $TiH_2$ powder. The foamed aluminum obtained by this method includes pores having large pore diameters of several millimeters.

The following method is exemplified as a fifth method. As disclosed in Patent Document 6, aluminum is mixed with metal of which eutectic temperature with aluminum is lower than the melting point of aluminum, and the mixture is heated at a temperature which is higher than the eutectic temperature and lower than the melting point of aluminum. Foamed aluminum obtained by this method has a porosity of about 40% which is low, although the pore diameters can be reduced by this method. Therefore, in the case where the foamed aluminum is used as a current collector, an amount of cathode active material or anode active material infiltrated into the pores of the foamed aluminum is small, and the desired high output and high energy density cannot be achieved.

Accordingly, among the aforementioned foam-melting method and the second to fifth methods, the second method in which aluminum is pressed into a casting mold having a core of sponge urethane, is employed as a method of producing foamed aluminum including fine open pores which can attain the high output and high energy density.

However, even in the second method, it is necessary to use sponge urethane having a fine microporous structure in order to further reduce the pore diameters of the open pores. In the case where such a sponge urethane is used, the flow of aluminum worsens; and thereby, aluminum cannot be press-filled into the hollow, or the casting pressure becomes excessively high. Therefore, it is difficult to manufacture foamed aluminum which includes pores having pore diameters that fulfill smaller than 40 PPI.

A slurry foaming method is disclosed in Patent Document 7 as a method for producing foamed metal which has a high porosity and includes open pores having small diameters and uniform dimensions, in which a plurality of fine open pores are uniformly arranged. In the slurry foaming method, foamable slurry containing metal powder and a foaming agent is foamed, and dried. Thereafter, the foamed and dried slurry is sintered. According to this method, if a raw material powder which can be sintered is prepared, it is possible to easily manufacture foamed metal which has a high porosity and includes open pores having uniform dimensions and arbitrary pore diameters that fulfill about 10 PPI to about 500 PPI, that is, within a pore diameter range of 2.5 mm to 50 μm. Here, the slurry foaming method means a method for producing foamed metal in which foaming is conducted by containing the foaming agent as described above or foaming is conducted by injecting gas and stirring, and the foamable slurry as described above is sintered in the foamed state.

However, conventionally, it is difficult to manufacture foamed aluminum by the slurry foaming method.

The reason is as follows. In the slurry foaming method, metal powder is sintered by free sintering which is performed without applying stress such as a compression stress or the like; and thereby, foamed metal is obtained. However, the surface of aluminum powder is covered with dense aluminum oxide film having a thickness of several nanometers to several tens of nanometers, and this aluminum oxide film inhibits the sintering regardless of being solid phase sintering or a liquid phase sintering. Therefore, it is difficult to proceed sintering by the free sintering; and as a result, uniform foamed aluminum cannot be obtained by the slurry foaming method.

Therefore, a method can be exemplified which employs a combination of the slurry foaming method and the aforementioned fifth method, as a method for sintering the aluminum powder by the free sintering. According to this method, copper powder is prepared as a metal whose eutectic temperature with aluminum is lower than the melting point of aluminum, and the copper powder and a foaming agent are mixed with aluminum. Then the mixture is heated and sintered at a temperature which is higher than the eutectic temperature and lower than the melting point of aluminum. Thereby, foamed aluminum is obtained. However, liquid droplets of aluminum ooze out of the surface, and the liquid droplets are solidified; and as a result, a plurality of aluminum lumps having semi-spherical shapes are formed. In particular, in the case where the foamed aluminum has a thin plate shape, the formation of the aluminum lumps occurs remarkably as shown in FIG. 4, and it is not possible to manufacture desired uniform foamed aluminum.

PRIOR ART DOCUMENT

Patent Documents

[Patent Document 1] Japanese Patent No. 3591055
[Patent Document 2] Japanese Unexamined Patent Application, Publication No. 2009-43536
[Patent Document 3] Japanese Unexamined Patent Application, Publication No. H08-209265
[Patent Document 4] Japanese Unexamined Patent Application, Publication No. 2007-238971
[Patent Document 5] Published Japanese Translation No. 2003-520292 of the PCT International Publication
[Patent Document 6] Japanese Examined Patent Application, Publication No. S61-48566
[Patent Document 7] Japanese Patent No. 3535282

DISCLOSURE OF THE INVENTION

Problems to be Solved by the Invention

The present invention is made in view of the above circumstances, and the present invention aims to provide a method for producing porous sintered aluminum, and in accordance with this method, it is possible to obtain uniform foamed aluminum which has a high porosity and includes open pores having pore diameters that fulfill 40 PPI or greater, that is, pore diameters of 600 μm or smaller, and uniform dimensions. In addition, the present invention also aims to provide porous sintered aluminum, and the porous sintered aluminum can be suitably used as a current collector for a positive electrode of a battery or a capacitor which requires high output and high energy density.

Means for Solving the Problems

The present inventors found that there were conditions under which it was possible to perform sintering even by free sintering without generating lumps of liquid droplets if an aluminum powder was mixed with a sintering aid powder containing titanium and the mixture was heated and sintered at a temperature within a predetermined range, and the present inventors completed the present invention.

That is, the method for producing porous sintered aluminum of the present invention includes: mixing aluminum powder with a sintering aid powder containing titanium to obtain a raw aluminum mixed powder; mixing the raw aluminum mixed powder with a water-soluble resin binder, water, and a plasticizer containing at least one selected from polyhydric alcohols, ethers, and esters to obtain a viscous composition; drying the viscous composition in a state where air bubbles are mixed therein to obtain a formed object prior to sintering; and heating the formed object prior to sintering in a non-oxidizing atmosphere. When a temperature at which the raw aluminum mixed powder starts to melt is expressed as Tm (° C.), then a temperature T (° C.) of the heating fulfills Tm−10 (° C.)≤T≤685 (° C.).

Here, the non-oxidizing atmosphere means an atmosphere in which raw aluminum mixed powder is not oxidized, and examples thereof include an inert atmosphere, and a reducing atmosphere. In addition, the aforementioned heating temperature is not the temperature of the raw aluminum mixed powder, that is, the heating temperature means not the measured reaction temperature of the raw aluminum mixed powder but the holding temperature of the surrounding around the raw aluminum mixed powder.

The method of the present invention is a method of subjecting new aluminum powder to free sintering, and the thus obtained sintered object (sintered body) is a porous sintered object (sintered body) in which the compounds of aluminum and titanium are dispersed and distributed uniformly and two or more pores are opened per linear length of 100 μm.

Moreover, with regard to the sintering method in the present invention, sintering is combined with a known slurry foaming method. As a result, the present invention relating to a production method was completed which enables to produce uniform foamed porous sintered aluminum that has high porosity and includes fine open pores having pore diameters of smaller than 600 μm and uniform dimensions.

That is, the present invention is characterized by the following steps. The raw aluminum mixed powder is mixed with a water-soluble resin binder, water, and a plasticizer containing at least one selected from polyhydric alcohols, ethers, and esters to obtain a viscous composition. The viscous composition is dried in a state where air bubbles are mixed therein to obtain a formed object prior to sintering. Then, the formed object prior to sintering is heated in a non-oxidizing atmosphere.

In those steps, the formed object prior to sintering which is foamed is produced from the raw aluminum mixed powder by a known slurry foaming method, and the formed object prior to sintering is sintered to produce the porous sintered aluminum. Thereby, a porous body is obtained which includes two different kinds of pores. The two different kinds of pores includes pores surrounded by sponge skeletons formed by the slurry foaming method and pores formed in the sponge skeleton itself.

In the method for producing porous sintered aluminum of the present invention, an average particle diameter of the aluminum powder may be in a range of 2 to 200 μm.

When an average particle diameter of the sintering aid powder is expressed as r (μm), and a mixing ratio of the sintering aid powder is expressed as W (% by mass), r and W may fulfill 1 (μm)≤r≤30 (μm), 1 (% by mass)≤W≤20 (% by mass), and 0.1≤W/r≤2.

The sintering aid powder may be either one or both of titanium and titanium hydride.

Non-water-soluble hydrocarbon system organic solvent containing 5 to 8 carbons may be added to the viscous composition.

The water-soluble resin binder may be contained at a content in a range of 0.5% to 7% of the quantity (mass) of the raw aluminum mixed powder.

Surfactant may be added to the raw aluminum mixed powder at a content in a range of 0.02 to 3% of the quantity (mass) of the raw aluminum mixed powder.

The viscous composition may be extended to have a thickness of 0.05 mm to 5 mm, and then the viscous composition may be dried to produce the formed object prior to sintering as a plate-like formed object.

The porous sintered aluminum of the present invention includes metal skeletons having a three-dimensional network structure of perforated sintered metal. Pores exist between the metal skeletons. Al—Ti compound is dispersed in the perforated sintered metal, and the pores are formed at an amount of 20 or more pores per linear length of 1 cm, and thereby, an overall porosity is in a range of 70 to 99%.

Effects of the Invention

In accordance with the method for producing porous sintered aluminum of the present invention, the aluminum powder is mixed with the sintering aid powder containing titanium to obtain the raw aluminum mixed powder, and then the raw aluminum mixed powder is heated at the temperature T which fulfills $Tm-10$ (° C.)$\leq T \leq 685$ (° C.). Thereby, it is possible to obtain porous sintered aluminum which includes two or more open pores per linear length of 100 μm.

Here, the reason that the heating temperature is limited to not less than $Tm-10$ (° C.) is because the temperature at which the aluminum powder contained in the raw aluminum mixed powder starts to react with the sintering aid powder containing titanium is $Tm-10$ (° C.). The melting point of aluminum is described as Tm because industrially used aluminum contains impurities such as iron and silicon and the melting point thereof becomes lower than 660° C., which is the melting point of pure aluminum. On the other hand, the reason that the heating temperature is limited to 685° C. or lower is because aluminum lumps having liquid droplet shapes are generated in the sintered body in the case where the mixture is heated and maintained at a temperature which is higher than 685° C.

At this time, the raw aluminum mixed powder is mixed with the water-soluble resin binder, water, and the plasticizer to obtain the viscous composition, and the viscous composition is dried in a state where air bubbles are mixed therein to obtain the formed object prior to sintering. Then, and the formed object prior to sintering is heated at a temperature in the above-mentioned range. As a result, since the formed object prior to sintering has a sponge skeleton structure (three-dimensional skeleton structure, foamed skeleton structure including open pores), the obtained sintered body is porous aluminum which includes two different kinds of pores including pores surrounded by the sponge skeletons and pores formed in the sponge skeleton itself.

The aluminum powder is provided such that the viscous composition has a viscosity at a level at which the composition can be formed into a desired shape and the formed object prior to sintering obtained by drying the viscous composition in a state where air bubbles are mixed therein has a desired handling strength. That is, in the case where the average particle diameter is small, it is necessary to increase the quantity (mass) of water-soluble resin coupler with respect to the quantity (mass) of the aluminum powder so as to secure the viscosity and the handling strength. However, in the case where the quantity (mass) of the water-soluble resin coupler becomes large, the amount of carbon remaining in the aluminum is increased during the formed object prior to sintering is heated, and the remained carbon inhibits the sintering reaction. On the other hand, in the case where the particle diameter of the aluminum powder is excessively large, the strength of the porous sintered body is lowered.

Therefore, it is preferable that the average particle diameter of the aluminum powder be in a range of 2 μm or greater; and thereby, the inhibition of the sintering reaction due to the large quantity (mass) of water-soluble resin coupler is prevented. Moreover, it is preferable that the average particle diameter of the aluminum powder be 200 μm or smaller; and thereby, the strength of the porous sintered body is secured. More preferably, the average particle diameter of the aluminum powder is set to be in a range of 7 μm to 40 μm.

With regard to the sintering aid powder, it is preferable that the average particle diameter r (μm) and the mixing ratio W (% by mass) fulfill 1 (μm)$\leq r \leq$30 (μm), 0.1 (% by mass) $\leq W \leq$20 (% by mass), and 0.1$\leq W/r \leq$2.

The reason is as follows. In the case where the mixing ratio W of the sintering aid powder exceeds 20% by mass, sintering aid particles have contacts with each other in the raw aluminum mixed powder; and thereby, the reaction heat between aluminum and titanium cannot be controlled, and a desired porous sintered body cannot be obtained. Therefore, it is preferable to fulfill 0.1 (% by mass)$\leq W \leq$20 (% by mass). In addition, it is more preferable to fulfill 1 (% by mass)$\leq W \leq$20 (% by mass).

Even in the case where the mixing ratio fulfills 0.1 (% by mass)$\leq W \leq$20 (% by mass), the reaction heat between aluminum and titanium became excessively high in some cases depending on the particle diameter of the sintering aid powder. In these cases, the temperature of melted aluminum due to the reaction heat further rose; and thereby, the viscosity thereof was lowered. As a result, liquid droplets were generated in some cases.

In view of these, test pieces were manufactured under various conditions, and the test pieces were observed by an electron microscope. As a result of the observation, it was found that only a surface layer portion having a substantially constant thickness from the exposed surface side of the titanium particle reacted with aluminum in the case where the amount of heat generation was controlled to be in a range controllable by the mixing ratio of titanium and the particle diameter of titanium. From the experimental results, it was found that the conditions of 1 (μm)$\leq r \leq$30 (μm) and 0.1 (% by mass)$\leq W/r \leq$2 (% by mass) are preferable in order to prevent the occurrence of liquid droplets.

Hereinafter, the meaning of 0.1$\leq W/r \leq$2 in the case of using titanium as the sintering aid powder will be described. When the average particle diameter of titanium is expressed as r, the number of titanium-particles is expressed as N, the additive quantity (mass) of titanium is expressed as w, the specific weight of titanium is expressed as D, and the reduction amount in the titanium particle diameter due to the reaction with aluminum is expressed as d, the reaction heat amount Q fulfills $Q \propto 4\pi r^2 dN$ since the reaction heat amount Q is proportional to the volume of reacted titanium. Moreover, since the additive amount of the titanium particles is calculated as a product of the average volume of one titanium particle and the number of titanium particles, $w=4/3\pi r^3 DN$ is obtained. Accordingly, if the latter equation is substituted into the former equation, $Q \propto 3wd/rD$ is obtained. Here, $Q \propto w/r$ is further obtained based on the fact that 3/D is a constant and the observation result that d is substantially constant regardless of the sintering conditions. Therefore, the range of W/r in which the liquid droplets are not generated is experimentally determined and the range is limited as described above.

Thereby, the generation of liquid droplets due to the excessively high reaction heat between aluminum and titanium is prevented.

In addition, the titanium hydride as the sintering aid powder contains titanium at a content of 95% by mass or greater, and dehydrogenation of the titanium hydride occur at a temperature of 470 to 530° C. to convert into titanium. Therefore, the titanium hydride is thermally decomposed into titanium by the aforementioned heating. Accordingly, it is possible to enhance the reaction efficiency with the aluminum powder by using titanium and/or titanium hydride as the sintering aid powder.

Furthermore, the viscous composition can be foamed by the addition of non-water-soluble hydrocarbon system organic solvent containing 5 to 8 carbons; and thereby, air bubbles can be mixed into the viscous composition.

In the case where the contained amount of the water-soluble coupler exceeds 7% of the quantity (mass) of the raw aluminum mixed powder, the amount of carbon remaining in the formed object prior to sintering is increased during heating, and the remained carbon inhibits the sintering reaction. On the other hand, in the case where the contained amount of the water-soluble coupler is less than 0.5%, it is not possible to secure the handling strength of the formed object prior to sintering. Therefore, it is preferable that the water-soluble coupler be contained at a content in a range of 0.5% to 7% of the quantity (mass) of the raw aluminum mixed powder.

In addition, it is possible to effectively generate air bubbles by adding a surfactant to the raw aluminum mixed powder. In the case where the added amount of this surfactant is set to be in a range of 0.02% or greater of the quantity (mass) of the raw aluminum mixed powder, it is possible to achieve an effect due to the addition of the surfactant. In the case where the added amount of the surfactant is set to be in a range of 3% or smaller of the quantity (mass) of the raw aluminum mixed powder, it is also possible to prevent the inhibition of the sintering reaction due to the increased amount of carbon remaining in the formed object prior to sintering.

In the case where the viscous composition is extended to have a thickness of 0.05 mm to 5 mm to form the formed object prior to sintering as a plate-shaped (plate-like) formed object, it is possible to obtain porous sintered aluminum by sintering the plate-shaped formed object, and the porous sintered aluminum is suitable as a current collector for a lithium-ion secondary battery or an electrical double layer capacitor.

Even in the case where the porous sintered aluminum of the present invention is used as a current collector of a positive electrode and the porous sintered aluminum is coiled around the outer circumference of a cylindrical battery element, cathode active material is not peeled off. In addition, even when expansion and contraction of the active material occur due to charging and discharging, the cathode active material is not easily peeled off. Therefore, the porous sintered aluminum of the present invention can be stably used as the current collector.

BEST MODE FOR CARRYING OUT THE INVENTION

Figure 1:
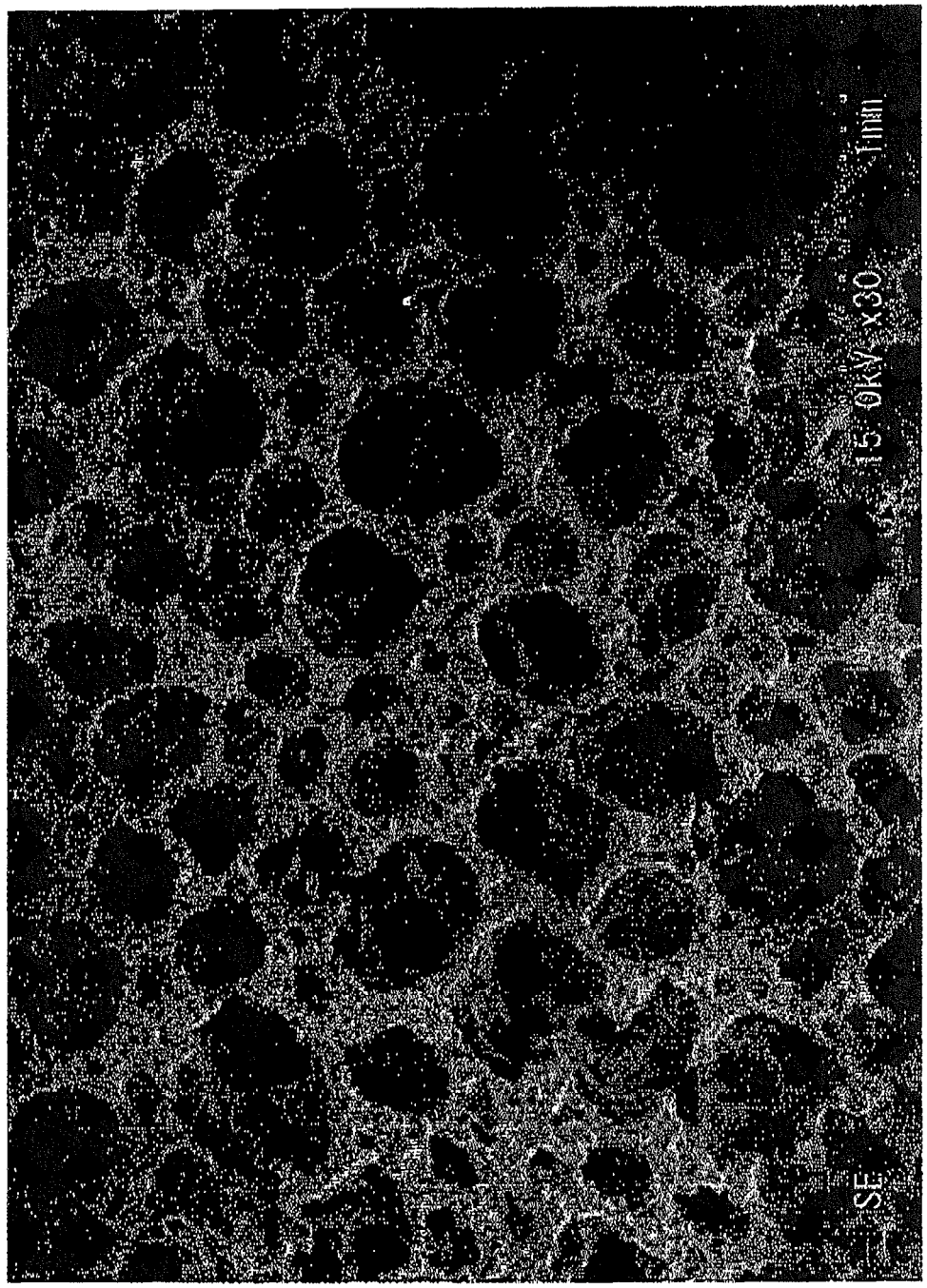
FIG. 1 is an SEM photograph of foamed aluminum in Example 1.

Hereinafter, one embodiment of the method for producing porous sintered aluminum according to the present invention will be described.

The method for producing aluminum of the present embodiment includes the following steps:

a process of providing raw aluminum mixed powder in which aluminum power is mixed with titanium and/or titanium hydride to obtain raw aluminum mixed powder;

a process of providing a viscous composition in which the raw aluminum mixed powder is mixed with water-soluble resin coupler, water, and plasticizer to provide a slurry viscous composition;

a process prior to sintering in which the viscous composition is dried in a state where air bubbles are mixed therein to obtain a formed object prior to sintering; and a sintering process in which the formed object prior to sintering is heated at a temperature T that fulfills Tm−10 (° C.)≤heating temperature T≤685 (° C.) in a non-oxidizing atmosphere.

Here, Tm (° C.) represents the temperature at which the raw aluminum mixed powder starts to melt.

In the process of providing the raw aluminum mixed powder, an aluminum powder having an average particle diameter of 2 to 200 μm is used. The reason is as follows. In the case where the average particle diameter is small, it is necessary to add a large amount of water-soluble resin coupler to the aluminum powder in order that the viscous composition has a viscosity at which the viscous composition can be formed in to a desired shape and the formed object prior to sintering has a handling strength. However, in the case where a large amount of water-soluble resin coupler is added, an amount of carbon remaining in the aluminum is increased when the formed object prior to sintering is heated, and the remained carbon inhibits the sintering reaction. On the other hand, in the case where the particle diameter of the aluminum powder is excessively large, the strength of the foamed aluminum is lowered. Accordingly, as described above, the aluminum powder having the average particle diameter in a range of 2 to 200 μm is used, and the average particle diameter is more preferably in a range of 7 to 40 μm.

The aluminum powder is mixed with titanium and/or titanium hydride. The reason is as follows. In the case where the aluminum powder is mixed with titanium and the formed object prior to sintering is heated at the heating temperature T which fulfills Tm−10 (° C.)≤heating temperature T≤685 (° C.), it is possible to perform free sintering of aluminum without generating lumps of liquid droplets. In addition, titanium hydride ($TiH_2$) contains titanium at a content of 47.88 (molecular weight of titanium)/(47.88+1 (molecular weight of hydrogen)×2), which is 95% by mass or greater, and dehydrogenation of the titanium hydride occurs at a temperature of 470 to 530° C. to convert into titanium. Therefore, the titanium hydride is thermally decomposed into titanium by the aforementioned heating. Accordingly, it is possible to perform free sintering of aluminum without generating lumps of liquid droplets even in the case where the titanium hydride is mixed thereinto.

Here, when the average particle diameter of titanium or titanium hydride is expressed as r (μm), and the mixing ratio of titanium or titanium hydride is expressed as W (% by mass), the following equations are fulfilled: 1 (μm)≤r≤30

(μm), 0.1 (% by mass)≤W≤20 (% by mass), and 0.1≤W/r≤2. For example, in the case where the titanium hydride powder has an average particle diameter of 4 μm, 0.1≤W/4≤2 is to be fulfilled; and therefore, the mixing ratio W becomes in a range of 0.4 to 8% by mass. In the case where the titanium powder has an average particle diameter of 20 μm, 0.1≤W/20≤2 is to be fulfilled; and therefore; the mixing ratio W becomes in a range of 2 to 40% by mass. However, since 0.1 (% by mass) ≤W≤20 (% by mass) is to be fulfilled, the mixing ratio becomes in a range of 2 to 20% by mass.

The average diameter of titanium hydride is set to fulfill 0.1 (μm)≤r≤30 (μm), the average diameter is preferably set to fulfill 1 (μm)≤r≤30 (μm) and is more preferably set to fulfill 4 (μm)≤r≤20 (μm). The reason is as follows. In the case where the average diameter is 1 μm or smaller, there is a concern of spontaneous combustion. After sintering, the titanium hydride becomes titanium grains covered with a compound of aluminum and titanium. In the case where the average particle diameter exceeds 30 μm, the compound phase of aluminum and titanium is easily peeled off from the titanium grains; and thereby, a desired strength of the sintered body cannot be obtained.

The reason that 0.1 (% by mass)≤W≤20 (% by mass) is set is as follows. In the case where the mixing ratio W of the sintering aid powder exceeds 20% by mass, the sintering aid particles contact with each other in the raw aluminum mixed powder; and thereby, the reaction heat between aluminum and titanium cannot be controlled, and a desired porous sintered body cannot be obtained.

Even in the case where the mixing ratio fulfills 0.1 (% by mass)≤W≤20 (% by mass), the reaction heat between aluminum and titanium became excessively high in some cases depending on the particle diameter of the sintering aid powder. In these cases, the temperature of melted aluminum due to the reaction heat further rose; and thereby, the viscosity thereof was lowered. As a result, liquid droplets were generated in some cases.

In view of these, test pieces were manufactured under various conditions, and the test pieces were observed by an electron microscope. As a result of the observation, it was found that only a surface layer portion having a substantially constant thickness from the exposed surface side of the titanium particle reacted with aluminum in the case where the amount of heat generation was controlled to be in a range controllable by the mixing ratio of titanium and the particle diameter of titanium. From the experimental results, it was found that the conditions of 1 (μm)≤r≤30 (μm) and 0.1 (% by mass)≤W/r≤2 (% by mass) are preferable in order to prevent the occurrence of liquid droplets.

Hereinafter, the meaning of 0.1≤W/r≤2 in the case of using titanium as the sintering aid powder will be described. When the average particle diameter of titanium is expressed as r, the number of titanium particles is expressed as N, the additive quantity (mass) of titanium is expressed as w, the specific weight of titanium is expressed as D, and the reduction amount in the titanium particle diameter due to the reaction with aluminum is expressed as d, the reaction heat amount Q fulfills $Q \propto 4\pi r^2 dN$ since the reaction heat amount Q is proportional to the volume of reacted titanium. Moreover, since the additive amount of the titanium particles is calculated as a product of the average volume of one titanium particle and the number of titanium particles, $w=4/3\pi r^3 DN$ is obtained. Accordingly, if the latter equation is substituted into the former equation, $Q \propto 3wd/rD$ is obtained. Here, $Q \propto w/r$ is further obtained based on the fact that 3/D is a constant and the observation result that d is substantially constant regardless of the sintering conditions. Therefore, the range of W/r in which the liquid droplets are not generated is experimentally determined and the range is limited as described above. Thereby, the generation of liquid droplets due to the excessively high reaction heat between aluminum and titanium is prevented.

The following components are added to the raw aluminum mixed powder in the process of providing the viscous composition: at least one kind selected from polyvinyl alcohol, methylcellulose, and ethylcellulose as a water-soluble resin coupler; at least one kind selected from polyethyleneglycol, glycerin, and di-N-buthyl phthalate as a plasticizer; distillated water; and alkylbetaine as a surfactant.

In the case where at least one kind selected from polyvinyl alcohol, methylcellulose, and ethylcellulose is used as the water-soluble resin coupler, a relatively small additive amount is sufficient. Therefore, the additive amount (ratio) thereof is set to be in a range of 0.5% to 7% of the quantity (mass) of the raw aluminum mixed powder. In the case where the additive amount of the water-soluble resin coupler exceeds 7% of the quantity (mass) of the raw aluminum mixed powder, the amount of carbon remaining in the formed object prior to sintering is increased during heating, and the remained carbon inhibits the sintering reaction. In the case where the additive amount of the water-soluble resin coupler is less than 0.5%, the handling strength of the formed object prior to sintering cannot be secured.

Alkylbetain is added at an amount (ratio) of 0.02% to 3% of the quantity (mass) of the raw aluminum mixed powder. In the case where the amount (containing ratio) is set to be 0.02% or higher of the quantity (mass) of the raw aluminum mixed powder, air bubbles are effectively generated during mixing a non-water-soluble hydrocarbon system organic solvent which will be described later. By setting the amount (containing ratio) to be 3% or lower, the inhibition of the sintering reaction due to the increased amount of carbon remaining in the formed object prior to sintering can be prevented.

After kneading the mixture, foaming is performed by further mixing the non-water-soluble hydrocarbon system organic solvent containing 5 to 8 carbons; and thereby, a viscous composition including air bubbles mixed thereinto is prepared. As the non-water-soluble hydrocarbon system organic solvent containing 5 to 8 carbons, at least one kind selected from pentane, hexane, heptane, and octane can be used.

Next, in the step prior to sintering, a strip-shaped polyethylene sheet is prepared of which the surface is coated with separating compound, and the viscous composition is extended to have a thickness of 0.05 mm to 5 mm by coating the viscous composition on the surface of the strip-shaped polyethylene sheet. Then, the temperature and moisture of the surrounding (circumferential atmosphere) are controlled for a specific time period so as to make the dimensions of air bubbles uniform. Thereafter, the resulting object is dried at a temperature of 70° C. by an air dryer. Here, the viscous composition is coated by a doctor blade method, a slurry extrusion method, or a screen printing method.

The dried viscous composition is peeled off from the polyethylene sheet, and then, if necessary, the dried viscous composition is cut out into a predetermined shape such as a circle having a diameter of 100 mm. Thereby, the formed object prior to sintering is obtained.

Next, in the sintering process, zirconia spinkle powder is spread on an alumina setter, and the formed object prior to sintering is placed on the alumina setter. Then, pre-sintering is performed by holding the formed object prior to sintering at 520° C. for one hour in an argon atmosphere whose dew point is −20° C. or lower. Thereby, the water-soluble resin coupler, a binder solution of the plasticizer component, the distilled water, and alkylbetaine are evaporated (removal of binder). In addition, dehydrogenation proceeds in the case where titanium hydride is used as the sintering aid powder.

Thereafter, the formed object prior to sintering which is pre-sintered is heated at a heating temperature T which fulfills Tm−10 (° C.)≤heating temperature T≤685 (° C.) to obtain foamed aluminum.

This is based on the following reason. It is considered that the reaction between aluminum and titanium starts by heating the formed object prior to sintering up to the melting temperature Tm (° C.). However, aluminum contains a very small amount of eutectic alloy elements such as Fe, Si, and the like as impurities in practice; and thereby, the melting point thereof is lowered. Therefore, it is considered that the reaction between aluminum and titanium starts by heating up to Tm−10 (° C.) and foamed aluminum is formed. In practice, the melting point of aluminum is 660° C.; however, the melting start temperature of an atomized powder having a purity of about 98% to 99.7%, which is marketed as a pure aluminum powder, is about 650° C.

On the other hand, in the case where the temperature reaches 665° C. which is the peritectic temperature of aluminum and titanium, and the melting latent heat is further input, the sintered aluminum (aluminum sintered body) is melted. Therefore, it is necessary to keep the temperature of a furnace atmosphere in a range of 685° C. or lower.

In addition, it is necessary to perform the heating of the sintering process in a non-oxidizing atmosphere in order to suppress the growth of oxide layers on the aluminum particle surface and the titanium particle surface. However, the oxide layers on the aluminum particle surface and the titanium particle surface do not remarkably grow even in the case of heating in the air under the conditions where the heating temperature is 400° C. or lower and the holding time is about 30 minutes. Therefore, the formed object prior to sintering may be heated and held at a temperature in a range of 300° C. to 400° C. for about 10 minutes in the air (removal of binder), and then the formed object prior to sintering may be heated at a predetermined temperature in an argon atmosphere.

The thus obtained foamed aluminum includes metal skeletons having a three-dimensional network structure of perforated sintered metal (perforated metal sintered body), and pores are included between the metal skeletons. In addition, Al—Ti compound is dispersed in the perforated sintered metal, 20 or more pores are formed per linear length of 1 cm, and the foamed aluminum has an overall porosity of 70 to 90% and is suitably used as a current collector of a lithium-ion secondary battery or an electrical double layer capacitor.

The present invention is not limited to the aforementioned embodiments, and a sintering aid powder other than titanium and titanium hydride may be used as long as a sintering aid powder which contains titanium as a sintering aid element is used.

In the method for producing foamed aluminum of the present embodiment, the aluminum powder is mixed with the titanium and/or titanium hydride as the sintering aid powder to prepare the raw aluminum mixed powder in the process of providing the raw aluminum mixed powder. Then, the viscous composition produced in the process of providing the viscous composition is foamed, and the viscous composition is heated at a temperature T which fulfills Tm−10 (° C.)≤T≤685 (° C.) in the sintering process. Thereby, it is possible to obtain uniform foamed aluminum which has a high porosity and includes two different kinds of pores. The two different kinds of pores includes pores which are surrounded by the sponge skeletons and have pore diameters of less than 600 μm and uniform dimensions, and fine pores, which are formed in the sponge skeleton itself at an amount of two or more pores per linear length of 100 μm. The titanium hydride contains titanium at a content of 95% by mass or greater and dehydrogenation of the titanium hydride occurs at a temperature of 470 to 530° C. to convert into titanium. Therefore, the titanium hydride is thermally decomposed into titanium by the aforementioned heating. Accordingly, it is considered that the titanium hydride contributes to producing foamed aluminum by the aforementioned heating in the same manner as titanium.

Moreover, the pre-sintering process is provided between the process of providing the viscous composition and the sintering process, and in the pre-sintering process, the strip-shaped polyethylene sheet is prepared of which the surface is coated with separating compound, and the viscous composition is extended to have a thickness of 0.05 mm to 5 mm by coating the viscous composition on the strip-shaped polyethylene sheet to obtain the formed object prior to sintering having a predetermined shape. In this case, by performing the sintering process as the post processing, it is possible to obtain foamed aluminum which is suitably used as a current collector of a lithium-ion secondary battery or an electrical double layer capacitor.

EXAMPLES

Examples 1 to 16

Al powders having average particle diameters of 2.1 μm, 9.4 μm, 24 μm, 87 μm, and 175 μm, Ti powders having average particle diameters of 9.8 μm, 24 μm, and 42 μm, and TiH$_2$ powders having average particle diameters of 4.2 μm, 9.1 μm, and 21 μm were prepared. Then, in accordance with the aforementioned embodiment, the Al powder was mixed with the Ti powder and/or the TiH$_2$ powder at the ratios shown in Table 1 to prepare raw aluminum mixed powders 1 to 10, and binder solutions 1 to 5 having the compounding compositions shown in Table 2 were prepared. They were kneaded with a non-water-soluble hydrocarbon system organic solvent at the ratios shown in Table 3 to manufacture viscous compositions of Examples 1 to 16.

TABLE 1

| | Raw aluminum mixed powder | | | | | | | | | | | | |
|---|---|---|---|---|---|---|---|---|---|---|---|---|---|
| | Aluminum powder | | | | | | | Sintering aid powder | | | | | |
| | Composition (% by weight) | | | | | | Average particle diameter (μm) | Mixing ratio (% by weight) | | Average particle diameter (μm) r | Aluminum powder | Sintering aid powder W | W/r |
| | Fe | Si | Ni | Mg | Cu | Al and inevitable impurities | | Ti | TiH$_2$ | | | | |
| Raw aluminum mixed powder 1 of the present invention | 0.15 | 0.05 | 0.01 | — | — | remainder | 24 | 0 | 100 | 9.1 | remainder | 1 | 0.11 |

TABLE 1-continued

| | Raw aluminum mixed powder | | | | | | | | | | | |
|---|---|---|---|---|---|---|---|---|---|---|---|---|
| | Aluminum powder | | | | | | Sintering aid powder | | | | | |
| | Composition (% by weight) | | | | | Average particle diameter (μm) | Mixing ratio (% by weight) | | Average particle diameter (μm) r | Aluminum powder | Sintering aid powder W | W/r |
| | Fe | Si | Ni | Mg | Cu | Al and inevitable impurities | | Ti | TiH$_2$ | | | | |
| Raw aluminum mixed powder 2 of the present invention | 0.15 | 0.05 | 0.01 | — | — | remainder | 24 | 0 | 100 | 21 | remainder | 5 | 0.24 |
| Raw aluminum mixed powder 3 of the present invention | 0.15 | 0.05 | 0.01 | — | — | remainder | 24 | 0 | 100 | 21 | remainder | 15 | 0.71 |
| Raw aluminum mixed powder 4 of the present invention | 0.15 | 0.05 | 0.01 | — | — | remainder | 24 | 0 | 100 | 9.1 | remainder | 10 | 1.1 |
| Raw aluminum mixed powder 5 of the present invention | 0.15 | 0.05 | 0.01 | — | — | remainder | 24 | 0 | 100 | 4.2 | remainder | 5 | 1.2 |
| Raw aluminum mixed powder 6 of the present invention | 0.15 | 0.05 | 0.01 | — | — | remainder | 24 | 0 | 100 | 2.8 | remainder | 5 | 1.8 |
| Raw aluminum mixed powder 7 of the present invention | 0.16 | 0.08 | — | — | — | remainder | 9.4 | 50 | 50 | 23 | remainder | 0.5 | 0.022 |
| Raw aluminum mixed powder 8 of the present invention | 0.18 | 0.06 | 0.01 | 0.4 | 1.6 | remainder | 87 | 100 | 0 | 24 | remainder | 1 | 0.042 |
| Raw aluminum mixed powder 9 of the present invention | 0.2 | 0.3 | 1.6 | 0.4 | 0.1 | remainder | 175 | 100 | 0 | 23 | remainder | 5 | 0.22 |
| Raw aluminum mixed powder 10 of the present invention | 0.2 | 0.05 | — | — | — | remainder | 2.1 | 0 | 100 | 4.2 | remainder | 1 | 0.24 |
| Comparative raw aluminum mixed powder 31 | 0.11 | 0.05 | — | — | — | remainder | 220*[1] | 100 | 0 | 24 | remainder | 5 | 0.21 |
| Comparative raw aluminum mixed powder 32 | 0.15 | 0.05 | 0.01 | — | — | remainder | 24 | 0 | 100 | 21 | remainder | 0.1 | 0.005*[2] |
| Comparative raw aluminum mixed powder 33 | 0.15 | 0.05 | 0.01 | — | — | remainder | 24 | 0 | 100 | 4.2 | remainder | 15 | 3.6*[2] |
| Comparative raw aluminum mixed powder 34 | 0.15 | 0.05 | 0.01 | — | — | remainder | 24 | 0 | 100 | 21 | remainder | 25*[2] | 1.2 |
| Comparative raw aluminum mixed powder 35 | 0.15 | 0.05 | 0.01 | — | — | remainder | 24 | 100 | 0 | 42*[2] | remainder | 15 | 0.36 |

*[1] out of the scope of Claim 3; average particle diameter of aluminum powder: 2 μm to 200 μm
*[2] out of the scope of Claim 4; average particle diameter and mixing ratio of sintering aid powder: $1 \leq r \leq 30$ and $0.01 \leq W/r \leq 2$

TABLE 2

| | Compounding composition of binder solution (% by weight) | | | | | | |
|---|---|---|---|---|---|---|---|
| | Water-soluble resin coupler | | | Plasticizer | | Surfactant | |
| | MC | EC | PVA | Gr | PEG | AB | Water |
| Binder solution 1 | 5 | — | — | 3 | 3 | 0.1 | remainder |
| Binder solution 2 | 0.1 | 2.9 | — | 3 | 3 | 0.5 | remainder |
| Binder solution 3 | 0.2 | — | 4.8 | 1 | 5 | 2 | remainder |
| Binder solution 4 | 9 | — | — | 7 | 5 | 0.5 | remainder |

TABLE 2-continued

Compounding composition of binder solution (% by weight)

| | Water-soluble resin coupler | | | Plasticizer | | Surfactant | |
|---|---|---|---|---|---|---|---|
| | MC | EC | PVA | Gr | PEG | AB | Water |
| Binder solution 5 | 5 | — | — | 3 | 3 | 5 | remainder |

MC: methylcellulose
EC: ethylcellulose
PVA: polyvinyl alcohol
Gr: glycerin
PEG: polyethyleneglycol
AB: alkylbetaine

TABLE 3

Components of viscous composition

| | Raw aluminum mixed powder A | | Binder solution | | Non-water-soluble hydrocarbon system organic solvent | | Ratio of waret-soluble resin coupler to A (%) | Ratio of surfactant to A (%) |
|---|---|---|---|---|---|---|---|---|
| | Type | Mixing ratio (% by weight) | Type | Mixing ratio (% by weight) | Type | Mixing ratio (% by weight) | | |
| Example 1 | Raw aluminum mixed powder 1 of the present invention | 50 | Binder solution 2 | 49 | hexane | 1 | 2.8 | 0.49 |
| Example 2 | Same as above | 50 | Binder solution 2 | 49 | heptane | 1 | 2.8 | 0.49 |
| Example 3 | Same as above | 50 | Binder solution 2 | 49 | heptane | 1 | 2.8 | 0.49 |
| Example 4 | Same as above | 49 | Binder solution 2 | 49 | octane | 2 | 2.8 | 0.49 |
| Example 5 | Same as above | 50 | Binder solution 1 | 49 | octane | 1 | 4.9 | 0.098 |
| Example 6 | Same as above | 50 | Binder solution 1 | 49 | hexane | 1 | 4.9 | 0.098 |
| Example 7 | Same as above | 50 | Binder solution 3 | 49 | pentane | 1 | 4.7 | 1.96 |
| Example 8 | Raw aluminum mixed powder 2 of the present invention | 50 | Binder solution 1 | 49 | hexane | 1 | 4.9 | 0.098 |
| Example 9 | Raw aluminum mixed powder 3 of the present invention | 50 | Binder solution 1 | 49 | hexane | 1 | 4.9 | 0.098 |
| Example 10 | Raw aluminum mixed powder 4 of the present invention | 50 | Binder solution 1 | 49 | pentane | 1 | 4.9 | 0.098 |
| Example 11 | Raw aluminum mixed powder 5 of the present invention | 50 | Binder solution 1 | 49 | heptane | 1 | 4.9 | 0.098 |
| Example 12 | Raw aluminum mixed powder 6 of the present invention | 50 | Binder solution 1 | 49 | heptane | 1 | 4.9 | 0.098 |
| Example 13 | Raw aluminum mixed powder 7 of the present invention | 50 | Binder solution 1 | 49 | octane | 1 | 4.9 | 0.098 |
| Example 14 | Raw aluminum mixed powder 8 of the present invention | 50 | Binder solution 1 | 49 | octane | 1 | 4.9 | 0.098 |
| Example 15 | Raw aluminum mixed powder 9 of the present invention | 50 | Binder solution 1 | 49 | pentane | 1 | 4.9 | 0.098 |
| Example 16 | Raw aluminum mixed powder 10 of the present invention | 50 | Binder solution 1 | 49 | octane | 1 | 4.9 | 0.098 |

Conditions of producing formed object prior to sintering

| | Thickness of formed coating (mm) | Process of adjusting dimensions of air bubbles uniformly | | | Drying process | |
|---|---|---|---|---|---|---|
| | | Temperature (° C.) | Moisture (%) | Holding time (minute) | Temperature (° C.) | Holding time (minute) |
| Example 1 | 0.35 | 35 | 90 | 20 | 70 | 50 |
| Example 2 | 0.35 | 35 | 90 | 20 | 70 | 50 |

TABLE 3-continued

| | | | | | | |
|---|---|---|---|---|---|---|
| Example 3 | 0.35 | 35 | 90 | 20 | 70 | 50 |
| Example 4 | 0.35 | 35 | 90 | 40 | 70 | 50 |
| Example 5 | 0.2 | 35 | 90 | 20 | 70 | 50 |
| Example 6 | 0.2 | 35 | 90 | 20 | 70 | 50 |
| Example 7 | 0.2 | 35 | 90 | 20 | 70 | 50 |
| Example 8 | 0.2 | 35 | 90 | 20 | 70 | 50 |
| Example 9 | 0.2 | 35 | 90 | 20 | 70 | 50 |
| Example 10 | 0.2 | 35 | 90 | 20 | 70 | 50 |
| Example 11 | 0.2 | 35 | 90 | 20 | 70 | 50 |
| Example 12 | 0.2 | 35 | 90 | 20 | 70 | 50 |
| Example 13 | 0.2 | 35 | 90 | 20 | 70 | 50 |
| Example 14 | 0.2 | 35 | 90 | 20 | 70 | 50 |
| Example 15 | 0.2 | 35 | 90 | 20 | 70 | 50 |
| Example 16 | 0.2 | 35 | 90 | 20 | 70 | 50 |

| | Heating conditions | | | | | |
|---|---|---|---|---|---|---|
| | Degreasing process | | | Sintering process | | |
| | Atmosphere | Temperature (° C.) | Holding time (minute) | Atmosphere | Temperature (° C.) | Holding time (minute) |
| Example 1 | Ar | 520 | 30 | Ar | 683 | 30 |
| Example 2 | Ar | 520 | 30 | Ar | 650 | 30 |
| Example 3 | Ar | 520 | 30 | Ar | 683 | 30 |
| Example 4 | Ar | 520 | 30 | Ar | 675 | 30 |
| Example 5 | Ar | 520 | 30 | Ar | 670 | 30 |
| Example 6 | Air | 350 | 30 | Ar | 670 | 30 |
| Example 7 | Air | 350 | 30 | Ar | 670 | 30 |
| Example 8 | Air | 350 | 30 | Ar | 670 | 30 |
| Example 9 | Air | 350 | 30 | Ar | 670 | 30 |
| Example 10 | Air | 350 | 30 | Ar | 670 | 30 |
| Example 11 | Air | 350 | 30 | Ar | 670 | 30 |
| Example 12 | Air | 350 | 30 | Ar | 670 | 30 |
| Example 13 | Air | 350 | 30 | Ar | 670 | 30 |
| Example 14 | Ar | 520 | 30 | Ar | 655 | 30 |
| Example 15 | Ar | 520 | 30 | Ar | 651 | 30 |
| Example 16 | Air | 350 | 30 | Ar | 670 | 30 |

Next, polyethylene sheets were prepared of which the surfaces were coated with separating compound, and the viscous compositions of Examples 1 to 16 were coated and extended on the surface of the polyethylene sheet by the doctor blade method, and the temperature and the moisture were controlled to be predetermined values for a specific time period so as to adjust the dimensions of air bubbles uniformly. Then, the viscous compositions were dried at 70° C. in an air dryer. The coating thicknesses of the viscous compositions, temperatures, moistures, and holding times at that time are shown in Table 3. Thereafter, the dried viscous compositions were peeled off from the polyethylene sheets and cut out into circular shapes having diameters of 100 mm to obtain formed objects prior to sintering in Examples 1 to 16.

Then, zirconia spinkle powder was spread on an alumina setter, and the formed objects prior to sintering in Examples 1 to 16 were placed on the alumina setter. The formed objects prior to sintering in Examples 1 to 16 were subjected to debinding in an atmosphere where argon flowed or in air. Thereafter, the formed objects prior to sintering in Examples 1 to 16 were heated to obtain foamed aluminums. The heating temperatures and heating holding times are also shown in Table 3.

Figure 2:
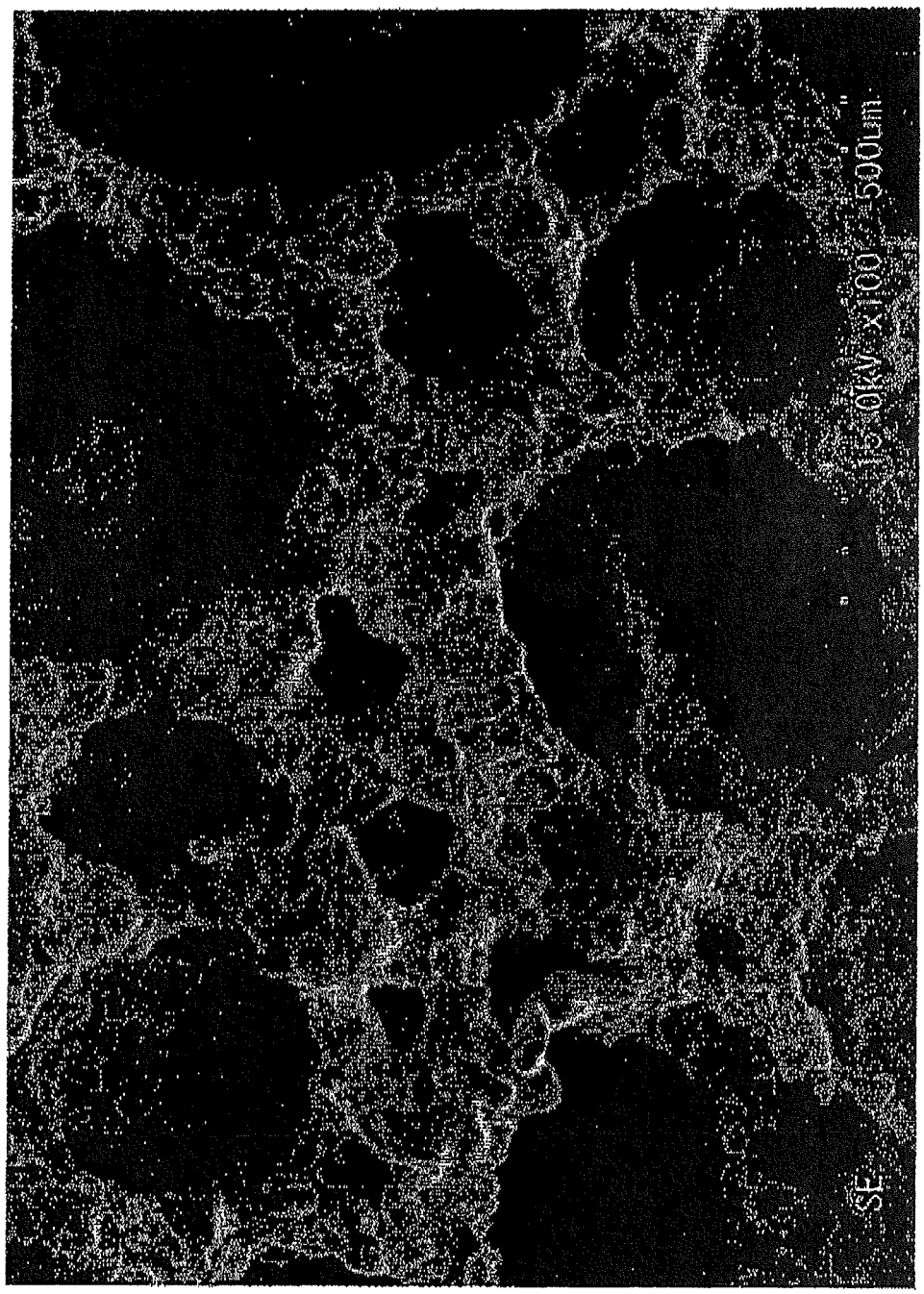
FIG. 2 is a partially enlarged SEM photograph of FIG. 1.

Next, the contraction percentages and porosities of the obtained foamed aluminums in Example 1 to 16 were calculated. In addition, the number of three-dimensional pores was measured in a stereoscopic microscope photograph, and the number of pores in the skeletons was measured in a scanning electron microscope (SEM) photograph. The obtained SEM photograph was observed to confirm whether solidification of liquid droplets occurred. Moreover, surface analyses were conducted by an electron probe microanalyzer (EPMA) to confirm whether Al—Ti compound existed on the surface of the skeletons of the foamed aluminums. The results are shown in Table 5, the SEM photograph of the foamed aluminums in Example 1 is shown in FIG. 1, and a partially enlarged photograph thereof is shown in FIG. 2.

Next, rolling extension tests were performed on the foamed aluminums in Examples 1 to 16 at a rolling reduction rate of 20%, and whether cracking occurred was visually confirmed. Thereafter, rectangular samples having dimensions of 20 mm×50 mm were cut out from the foamed aluminums, and the electrical resistances between opposed corners were measured. Then, the rectangular samples of the foamed aluminums were wound around an outer circumference of a cylindrical object having a diameter of 5 mm, and whether cracking occurred was visually confirmed. The results are shown in Table 5.

Comparative Examples 1 to 9

Figure 3:
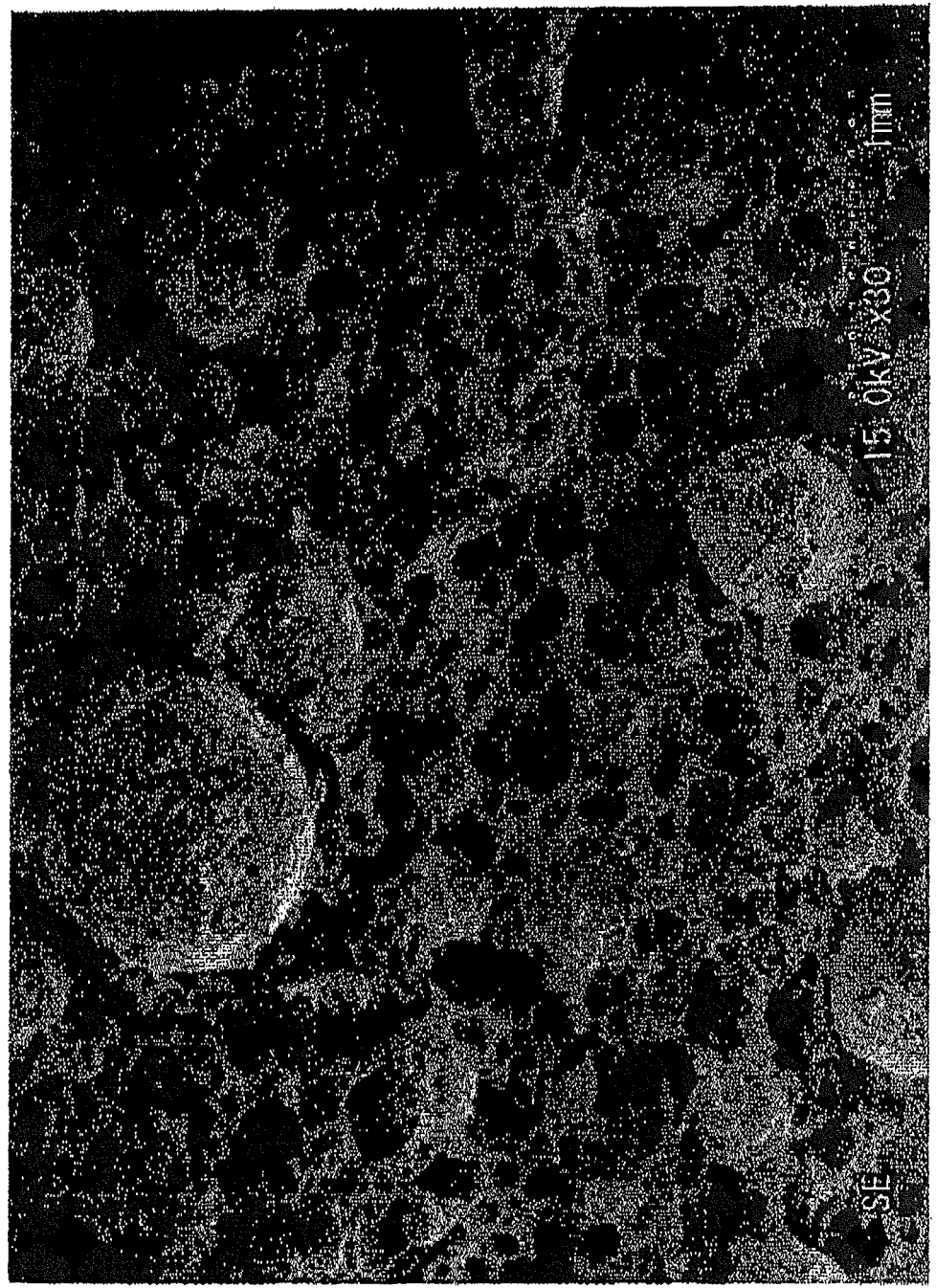
FIG. 3 is an SEM photograph of foamed aluminum in Comparative Example 1.
Figure 4:
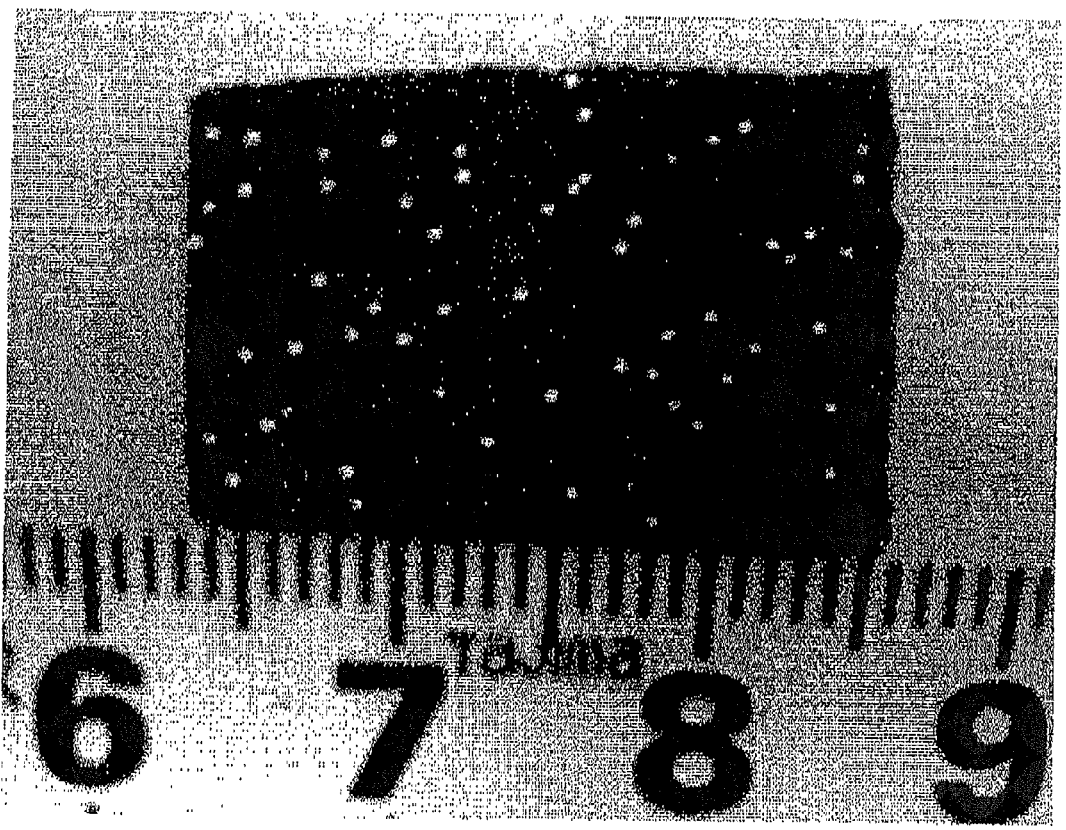
FIG. 4 is a photograph of foamed aluminum obtained by a combined method which includes a fifth method in the conventional art as a method of performing free sintering of aluminum powder and a slurry foaming method.

Comparative raw aluminum mixed powders 31 to 35 were prepared by using the same Al powder, Ti powder, and TiH$_2$ powder as those in Examples, Either one of the comparative raw aluminum mixed powders 31 to 35 and the raw aluminum mixed powder 1 of the present invention was mixed and kneaded with either one of the binder solutions 1 to 5 shown in Table 2 and the non-water-soluble hydrocarbon system organic solvent at the mixing ratios shown in Table 4. Other conditions were same as those in Examples. Thereby, foamed aluminums in Comparative Examples 1 to 9 were produced. The foamed aluminums in Comparative Examples 1 to 9 were evaluated by the same methods as those for Examples, The evaluation results are shown in Table 5, and an SEM photograph of the foamed aluminum in Comparative Example 1 is shown in FIG. 3.

TABLE 4

| | Components of viscous composition | | | | | | | |
|---|---|---|---|---|---|---|---|---|
| | Raw aluminum mixed powder A | | Binder solution | | Non-water-soluble hydrocarbon system organic solvent | | Ratio of waret-soluble resin coupler to A (%) | Ratio of surfactant to A (%) |
| | Type | Mixing ratio (% by weight) | Type | Mixing ratio (% by weight) | Type | Mixing ratio (% by weight) | | |
| Comparative Example 1 | Raw aluminum mixed powder 1 of the present invention | 50 | Binder solution 2 | 49 | hexane | 1 | 2.8 | 0.49 |
| Comparative Example 2 | Same as above | 50 | Binder solution 2 | 49 | heptane | 1 | 2.8 | 0.49 |
| Comparative Example 3 | Same as above | 50 | Binder solution 4 | 49 | octane | 1 | 8.82*4 | 0.49 |
| Comparative Example 4 | Same as above | 49 | Binder solution 5 | 49 | pentane | 1 | 4.9 | 4.9*5 |
| Comparative Example 5 | Comparative raw aluminum mixed powder 31 | 50 | Binder solution 1 | 49 | pentane | 1 | 4.9 | 0.098 |
| Comparative Example 6 | Comparative raw aluminum mixed powder 32 | 50 | Binder solution 1 | 49 | hexane | 1 | 4.9 | 0.098 |
| Comparative Example 7 | Comparative raw aluminum mixed powder 33 | 50 | Binder solution 1 | 49 | heptane | 1 | 4.7 | 0.098 |
| Comparative Example 8 | Comparative raw aluminum mixed powder 34 | 50 | Binder solution 1 | 49 | octane | 1 | 4.9 | 0.098 |
| Comparative Example 9 | Comparative raw aluminum mixed powder 35 | 50 | Binder solution 1 | 49 | pentane | 1 | 4.9 | 0.098 |

| | Condition of producing formed object prior to sintering | | | | | |
|---|---|---|---|---|---|---|
| | Thickness of formed coating (mm) | Process of adjusting dimensions of air bubbles uniformly | | | Drying process | |
| | | Temperature (° C.) | Moisture (%) | Holding time (minute) | Temperature (° C.) | Holding time (minute) |
| Comparative Example 1 | 0.35 | 35 | 90 | 20 | 70 | 50 |
| Comparative Example 2 | 0.35 | 35 | 90 | 20 | 70 | 50 |
| Comparative Example 3 | 0.35 | 35 | 90 | 20 | 70 | 50 |
| Comparative Example 4 | 0.2 | 35 | 90 | 20 | 70 | 50 |
| Comparative Example 5 | 0.2 | 35 | 90 | 20 | 70 | 50 |
| Comparative Example 6 | 0.2 | 35 | 90 | 20 | 70 | 50 |
| Comparative Example 7 | 0.2 | 35 | 90 | 20 | 70 | 50 |
| Comparative Example 8 | 0.2 | 35 | 90 | 20 | 70 | 50 |
| Comparative Example 9 | 0.2 | 35 | 90 | 20 | 70 | 50 |

| | Heating conditions | | | | | |
|---|---|---|---|---|---|---|
| | Degreasing process | | | Sintering process | | |
| | Atmosphere | Temperature (° C.) | Holding time (minute) | Atmosphere | Temperature (° C.) | Holding time (minute) |
| Comparative Example 1 | Ar | 520 | 30 | Ar | 690*3 | 30 |
| Comparative Example 2 | Ar | 520 | 30 | Ar | 620*3 | 30 |
| Comparative Example 3 | Ar | 520 | 30 | Ar | 683 | 30 |
| Comparative Example 4 | Ar | 520 | 30 | Ar | 670 | 30 |
| Comparative Example 5 | Air | 350 | 30 | Ar | 670 | 30 |
| Comparative Example 6 | Air | 350 | 30 | Ar | 670 | 30 |

TABLE 4-continued

| | | | | | | |
|---|---|---|---|---|---|---|
| Comparative Example 7 | Air | 350 | 30 | Ar | 670 | 30 |
| Comparative Example 8 | Air | 350 | 30 | Ar | 670 | 30 |
| Comparative Example 9 | Air | 350 | 30 | Ar | 670 | 30 |

*[4] out of the scope of Claim 7
*[5] out of the scope of Claim 8
*[3] out of the scope of Claim 1

TABLE 5

| | Evaluation of foamed aluminum | | | | | | Evaluation of current collector for positive electrode of lithium-ion battery | |
|---|---|---|---|---|---|---|---|---|
| | Number of three-dimensional pores (PPI*[1]) | Number of pores in skeleton per skeleton length of 100 μm (pores/100 μm) | Presence or absence of solidified aluminum in the form of liquid droplet | Presence or absence of Al—Ti compound on skeleton surface | Electric resistivity (×10⁻⁶ Ωm) | Presence or absence of cracking after 10% rolling and 5 mmφ winding test | Filling density of active material (g/cm³) | Minimum diameter at which active material does not fall in winding test (mmφ) |
| Example 1 | 52 | 2.9 | Absent | Present | 3.1 | Absent | 4.8 | 2 |
| Example 2 | 52 | 3.5 | Absent | Present | 5.4 | Absent | 4.7 | 2 |
| Example 3 | 52 | 2.2 | Absent | Present | 2.2 | Absent | 4.6 | 1.5 |
| Example 4 | 65 | 2.3 | Absent | Present | 2.5 | Absent | 4.8 | 2 |
| Example 5 | 56 | 2.5 | Absent | Present | 2.6 | Absent | 4.2 | 2 |
| Example 6 | 55 | 2.5 | Absent | Present | 2.6 | Absent | 4.2 | 1.5 |
| Example 7 | 77 | 2.7 | Absent | Present | 2.7 | Absent | 4.2 | 2 |
| Example 8 | 54 | 2.8 | Absent | Present | 2.9 | Absent | 4.3 | 2 |
| Example 9 | 55 | 2.3 | Absent | Present | 2.3 | Absent | 4.3 | 2 |
| Example 10 | 52 | 2.6 | Absent | Present | 2.8 | Absent | 4.2 | 2 |
| Example 11 | 53 | 2.2 | Absent | Present | 3.2 | Absent | 4.2 | 2 |
| Example 12 | 55 | 2.4 | Absent | Present | 3.2 | Absent | 4.3 | 2 |
| Example 13 | 53 | 2.8 | Absent | Present | 3.4 | Absent | 4.1 | 2 |
| Example 14 | 55 | 3.4 | Absent | Present | 4.9 | Absent | 4.1 | 2.5 |
| Example 15 | 55 | 3.2 | Absent | Present | 4.3 | Absent | 4.2 | 2.5 |
| Example 16 | 54 | 2.4 | Absent | Present | 3.2 | Absent | 4.2 | 2 |
| Comparative Example 1 | 70 | 2 | Present* | Present | 2.9 | Present* | — | — |
| Comparative Example 2 | 50 | 5.1 | Absent | Present | 12.4* | Present* | — | — |
| Comparative Example 3 | 51 | 4.6 | Absent | Present | 11.9* | Present* | — | — |
| Comparative Example 4 | 65 | 4.3 | Absent | Present | 11.2* | Present* | — | — |
| Comparative Example 5 | 52 | 1.8* | Absent | Present | 8.9* | Present* | — | — |
| Comparative Example 6 | 53 | 5.2 | Absent | Absent | 12.2* | Present* | — | — |
| Comparative Example 7 | 51 | 2.6 | Present* | Present | 2.4 | Absent | — | — |
| Comparative Example 8 | 51 | 2.2 | Absent | Present | 2.8 | Present* | — | — |
| Comparative Example 9 | 55 | 1.8* | Absent | Present | 3.1 | Present* | — | — |
| Conventional Example 1 | 30 | 0 | Absent | Absent | 1.5 | Absent | 3.8 | 3.5 |

*[1]PPI: number of pores per inch (25.4 mm)

As can be understood from Table 5, with regard to the foamed aluminums in Examples 1 to 16, the numbers of pores per skeleton length of 100 μm of the perforated sintered metals were in a range of 2 to 4, and the numbers of three-dimensional pores per one inch were in a range of 52 or more, that is, the numbers of the three-dimensional pores per one centimeter in the metal skeletons were in a range of 20 or more. In addition, no lumps of liquid droplets were generated in the foamed aluminums, the electrical resistances were low, and no cracking due to the winding test were observed. Accordingly, the foamed aluminums in Examples 1 to 16 are suitable as a current collector for a positive electrode of a battery or a capacitor which requires high output and high energy density.

Next, a lithium cobalt oxide ($LiCoO_2$) powder as an active material, polyvinylidene fluoride (PVdF) as a coupler, artificial graphite powder as a conductive material were mixed at a ratio by weight of 86:6:8 to prepare a cathode material. N-methyl-2 pyrrolidone as a solvent was mixed with the cathode material to prepare a cathode active material slurry.

Then, the foamed aluminums in Examples 1 to 16 and foamed aluminum in Conventional Example 1 were immersed into this cathode active material slurry for 10 minutes. The foamed aluminums were taken therefrom, and dried. Thereafter, the foamed aluminums were rolled to produce cathodes of lithium-ion batteries in Examples 1 to 16 having thicknesses of 0.5 mm.

Here, as the foamed aluminum in Conventional Example 1, foamed aluminum of 30 PPI was used. The foamed aluminum was produced by a method of pressing aluminum into a casting mold having a core of sponge urethane which is mentioned as the second method in the related art. In addition, the filling densities of the cathode active materials of the foamed aluminum in Examples 1 to 16 and the foamed aluminum in Conventional Example 1 are shown in Table 5.

Then, cylindrical objects having diameters of 1 mm, 1.5 mm, 2 mm, 2.5 mm, 3 mm, 3.5 mm, 4 mm, 4.5 mm, and 5 mm were respectively prepared. The cathodes of lithium-ion batteries in Examples 1 to 16 and Conventional Example 1 were wound. Whether or not the active materials were peeled off was visually observed, and the minimum diameters with which peeling were not observed are shown in Table 5.

As can be understood from the results in Table 5, with regard to the cathodes of the lithium-ion batteries in Examples 1 to 16, the active materials were not peeled off even in the case where the cathodes were wound around the cylindrical objects having diameters of 1.5 mm to 2.5 mm. On the other hand, with regard to the cathode in Conventional Example 1, the active material was peeled off when the cathode was wound around the cylindrical object having a diameter of 3 mm. In addition, the active material filling density of the cathode of the lithium-ion batteries in Examples 1 to 16 were in a range of 4.1 g/cm$^3$ or greater. In contrast, the active material filling density of the cathode in Conventional Example 1 was 3,841 g/cm$^3$, which was small.

INDUSTRIAL APPLICABILITY

The present invention can be applied as a method for producing a current collector of a lithium-ion secondary battery or an electrical double layer capacitor as well as a method for producing foamed aluminum.

The invention claimed is:

1. Porous sintered aluminum comprising:
   metal skeletons having a three-dimensional network structure of perforated sintered metal,
   wherein pores exist between the metal skeletons,
   Al—Ti compound is dispersed in the perforated sintered metal, and the pores are formed at an amount of 20 or more pores per linear length of 1 cm, and thereby, an overall porosity is in a range of 70 to 99%, and
   pores exist in the metal skeleton of the perforated sintered metal.

* * * * *